US009291066B2

(12) United States Patent
Zheng et al.

(10) Patent No.: US 9,291,066 B2
(45) Date of Patent: Mar. 22, 2016

(54) METHODS AND SYSTEMS FOR SEALING A ROTARY MACHINE USING A SEGMENTED SEAL RING

(71) Applicant: General Electric Company, Schenectady, NY (US)

(72) Inventors: Xiaoqing Zheng, Niskayuna, NY (US); Roderick Mark Lusted, Niskayuna, NY (US); Azam Mihir Thatte, Rotterdam, NY (US); Christopher David Suttles, Greer, SC (US)

(73) Assignee: General Electric Company, Schenectady, NY (US)

( * ) Notice: Subject to any disclaimer, the term of this patent is extended or adjusted under 35 U.S.C. 154(b) by 116 days.

(21) Appl. No.: 14/076,925

(22) Filed: Nov. 11, 2013

(65) Prior Publication Data

US 2015/0132116 A1    May 14, 2015

(51) Int. Cl.
*F16J 15/34* (2006.01)
*F01D 11/00* (2006.01)

(52) U.S. Cl.
CPC ........... *F01D 11/003* (2013.01); *F16J 15/3436* (2013.01)

(58) Field of Classification Search
CPC . F16J 15/3436; F16J 15/3452; F16J 15/3464; F16J 15/3488
See application file for complete search history.

(56) References Cited

U.S. PATENT DOCUMENTS

| 3,612,630 | A | | 10/1971 | Rosensweig |
|---|---|---|---|---|
| 3,841,787 | A | | 10/1974 | Scalzo |
| 4,576,384 | A | | 3/1986 | Azibert |
| 4,579,349 | A | | 4/1986 | Pipich et al. |
| 5,192,085 | A | * | 3/1993 | McOnie ........................ 277/370 |
| 5,820,129 | A | * | 10/1998 | Reagan ......................... 277/314 |
| 5,913,521 | A | * | 6/1999 | Sangren et al. ............... 277/372 |
| 5,961,122 | A | * | 10/1999 | Marsi ............................ 277/306 |
| 6,059,293 | A | | 5/2000 | Azibert et al. |
| 6,068,264 | A | | 5/2000 | Azibert et al. |
| 6,131,912 | A | | 10/2000 | Azibert et al. |
| 2002/0096835 | A1 | | 7/2002 | Azibert et al. |
| 2005/0242515 | A1 | | 11/2005 | Brooks et al. |

* cited by examiner

*Primary Examiner* — Gilbert Lee
(74) *Attorney, Agent, or Firm* — Armstrong Teasdale LLP (57) ABSTRACT

A hydrodynamic face seal ring for use in a rotary machine includes a support ring having at least two support ring segments and a radially-extending, first face. The support ring is configured to releasably couple to an inner surface of an outer casing of the rotary machine. The face seal ring also includes a sealing ring substantially concentric with the support ring. The sealing ring includes at least two sealing ring segments and a radially-extending, second face. The sealing ring is releasably coupled to the support ring such that the first face is mated against the second face.

19 Claims, 5 Drawing Sheets

METHODS AND SYSTEMS FOR SEALING A ROTARY MACHINE USING A SEGMENTED SEAL RING

BACKGROUND OF THE INVENTION

This application relates generally to rotary machines and more particularly, to systems and methods for sealing a rotary machine.

At least some rotary machines, such as steam turbine engines, have a defined fluid flow path extending therethrough. The flow path includes, in a serial-flow relationship, a fluid inlet, a turbine, and a fluid outlet. Some rotary machines use a plurality of sealing assemblies in the flow path to facilitate increasing the operating efficiency of the rotary machine. Generally, known seal assemblies are coupled between a stationary component and a rotary component to provide sealing between a high-pressure area and a low-pressure area. Several known sealing assemblies include labyrinth teeth, flexible members such as brush seals, and hydrodynamic face seals.

At least some brush seals include tightly-packed, generally cylindrical bristles that are positioned adjacent to the rotary component and that are arranged in a staggered arrangement to facilitate reducing leakage. Generally, known bristles have a low radial stiffness that enables them to move during a rotary component rotor excursion while maintaining a tight clearance during steady state operations. Some known brush seals, however, are generally effective only when a limited pressure differential exists across the seal. In addition, at least some sealing assemblies include a plurality of labyrinth teeth that extend outwardly towards the rotary component. During operation of some rotary machines, vibrations caused by rotation of the rotary component may cause the labyrinth teeth to contact the rotary component. Over time, the labyrinth teeth may become worn and become less effective, which may cause performance deterioration of the rotary machines.

In some known rotary machines, hydrodynamic face seals are used to facilitate reducing leakage of a pressurized fluid through a gap between two components. Hydrodynamic face seals generally include a mating (rotating) ring and a seal (stationary) ring. During operation, grooves in the rotating ring generate a hydrodynamic force that causes the stationary ring to lift or separate from the rotating ring such that a small gap is created between the two rings. A sealing gas flows via the gap between the rotating and stationary rings. However, because the gap formed between the two rings is small, at least some known hydrodynamic face seals are fabricated as single continuous rings, which limits the diameter of the seal rings, and as such, may limit their use. There are at least two primary reasons a single continuous ring is limited in size. One reason is that it is challenging to achieve the required sealing face flatness for rings over 12 inches in diameter. Another critical reason is that sealing face coning increases with the fourth power of diameter from a thermal gradient across the seal face. Face coning is one main failure mode for hydrodynamic face seals. In addition, in large steam turbine and gas turbine applications, there is an assembly problem with single continuous ring construction since such large turbines are assembled in upper and lower halves. Therefore, to use a face seal in large steam and gas turbines, one of the sealing rings must be segmented. Because the mating ring can be fabricated integrally with the turbine shaft, it is preferred to have the seal ring segmented. Some advantages of a segmented seal ring include that seal face flatness can be straightforwardly achieved, and face coning from a thermal gradient is largely eliminated because seal ring hoop-stress is cut off at the segment joints. However, if the stationary ring is segmented and coupled together, there may be a step over the segment joint that is larger than the film thickness since hydrodynamic face seals generally operate with a clearance of about 0.002 inches or less. Such limitations make at least some known hydrodynamic face seals unsuitable for use in rotary machines with large diameter rotating shafts.

BRIEF DESCRIPTION OF THE INVENTION

In one aspect, a hydrodynamic face seal ring for use in a rotary machine is provided. The face seal ring includes a support ring comprising at least two support ring segments and a radially-extending, first face. The support ring is configured to releasably couple to an inner surface of an outer casing of the rotary machine. The face seal ring also includes a sealing ring coupled substantially coaxially with the support ring. The sealing ring comprises at least two sealing ring segments and a radially-extending, second face. The sealing ring is releasably coupled to the support ring such that the first face is mated against the second face.

In another aspect, a rotary machine is provided. The rotary machine comprises a casing and a rotatable shaft having a centerline axis. The rotary machine also comprises a sealing system including a first seal ring having a first primary sealing surface. The sealing system further includes a second seal ring having a second primary sealing surface. The second seal ring includes a support ring comprising at least two support ring segments and a radially-extending, first face. The support ring layer is configured to releasably couple to an inner surface of the casing. The second seal ring also includes a sealing ring having at least two sealing ring segments and a radially-extending, second face. The sealing ring layer is configured to releasably couple to the support ring such that the first face is mated against the second face. layer. The sealing system further includes a seal housing coupled to the second seal ring and moveable therewith.

In yet another aspect, a method of assembling a sealing system is provided. The method includes coupling a seal housing to an inner surface of a casing of a rotary machine. The method also includes releasably coupling a support ring to the seal housing where the support ring includes at least two support ring segments coupled together at a respective support ring joint and a radially-extending, first face. The method further includes releasably coupling a sealing ring coaxially to the support ring. The sealing ring includes at least two sealing ring segments joining together at a respective sealing ring joint and a radially-extending, second face.

DETAILED DESCRIPTION OF THE INVENTION

The exemplary systems and methods described herein overcome at least some of the disadvantages associated with rotary machines that may operate with process fluid leakage from the rotary machine to the external environment. The embodiments described herein provide a sealing assembly that substantially reduces process fluid leakage from a rotary machine, thus facilitating improving rotary machine performance. More specifically, the sealing assembly described herein is a multiple layer, segmented hydrodynamic face seal ring that includes a plurality of seal segments that may be easily assembled on, or disassembled from, a large diameter rotatable shaft, such as the rotatable shaft of a steam turbine engine.

Figure 1:
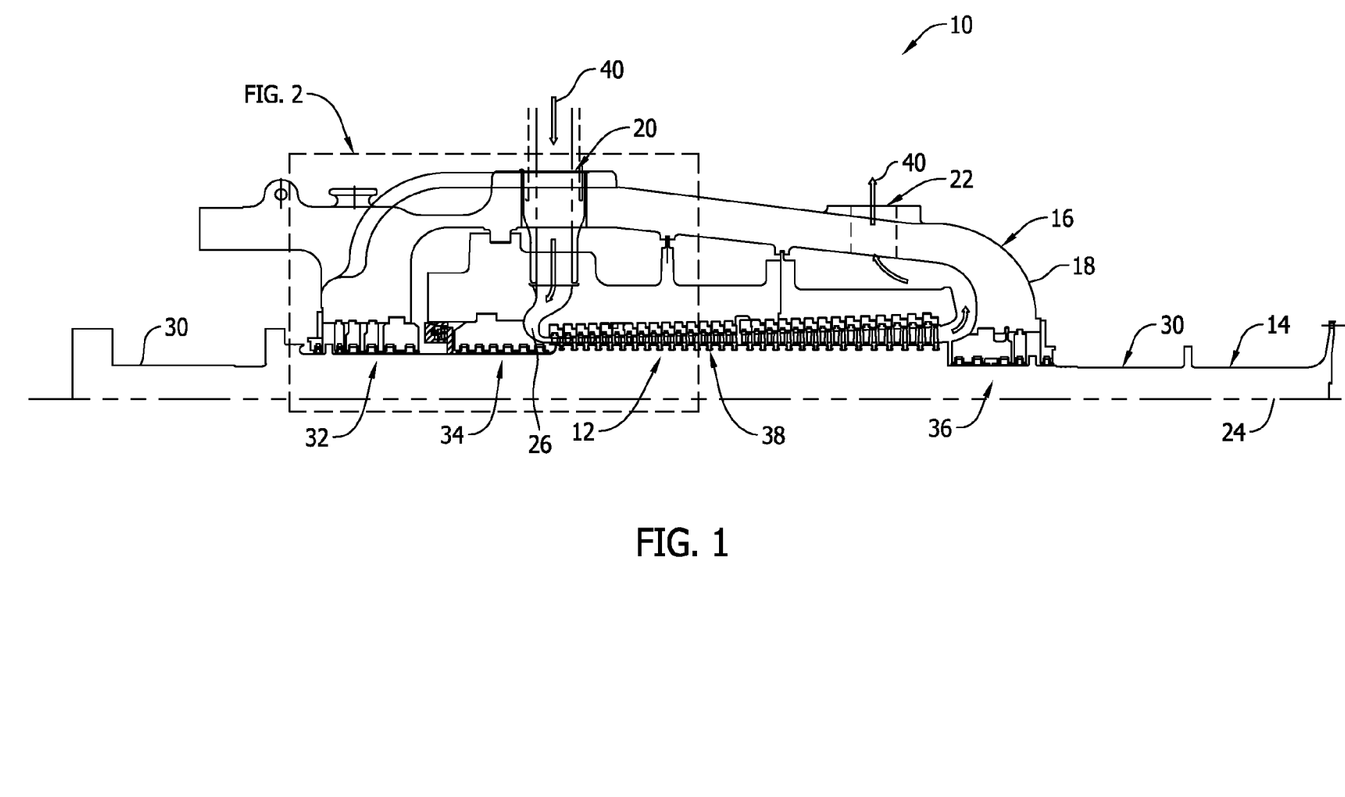
FIG. 1 is a schematic view of an exemplary steam turbine engine.

FIG. 1 is a schematic view of an exemplary steam turbine engine 10. While FIG. 1 describes an exemplary steam turbine engine, it should be noted that the sealing apparatus, system, and method described herein is not limited to any one particular type of turbine engine. One of ordinary skill in the art will appreciate that the current sealing apparatus, system, and method described herein may be used with any rotary machine, including a gas turbine engine, in any suitable configuration that enables such an apparatus, system, and method to operate as further described herein.

In the exemplary embodiment, steam turbine engine 10 is a single-flow steam turbine engine. Alternatively, steam turbine engine 10 may be any type of steam turbine, such as, without limitation, a low-pressure turbine, an opposed-flow, high-pressure and intermediate-pressure steam turbine combination, a double-flow steam turbine engine, and/or the like. Moreover, as discussed above, the present invention is not limited to only being used in steam turbine engines and can be used in other turbine systems, such as gas turbine engines.

In the exemplary embodiment, steam turbine engine 10 includes a plurality of turbine stages 12 that are coupled to a rotatable shaft 14. A casing 16 is divided horizontally into an upper half section 18 and a lower half section (not shown). The turbine engine 10 includes a high pressure steam inlet conduit 20 and a low pressure steam exhaust conduit 22. Shaft 14 extends through casing 16 along a centerline axis 24. Shaft 14 is supported at opposite end portions 30 of shaft 14 by journal bearings (not shown). A plurality of end packing regions or sealing members 32, 34, and 36 are coupled between rotatable shaft end portions 30 and casing 16 to facilitate sealing casing 16 about shaft 14.

During operation, high pressure and high temperature steam 40 is channeled to turbine stages 12 from a steam source, such as a boiler or the like (not shown), wherein thermal energy is converted to mechanical rotational energy by turbine stages 12. More specifically, steam 40 is channeled through casing 16 via steam inlet conduit 20 into an inlet bowl 26 where it impacts a plurality of turbine blades or buckets 38 coupled to shaft 14 to induce rotation of shaft 14 about centerline axis 24. Steam 40 exits casing 16 at exhaust conduit 22. Steam 40 may then be channeled to a reheat boiler (not shown) where it may be reheated or channeled to other components of the system, e.g., a low pressure turbine section or a condenser (not shown).

Figure 2:
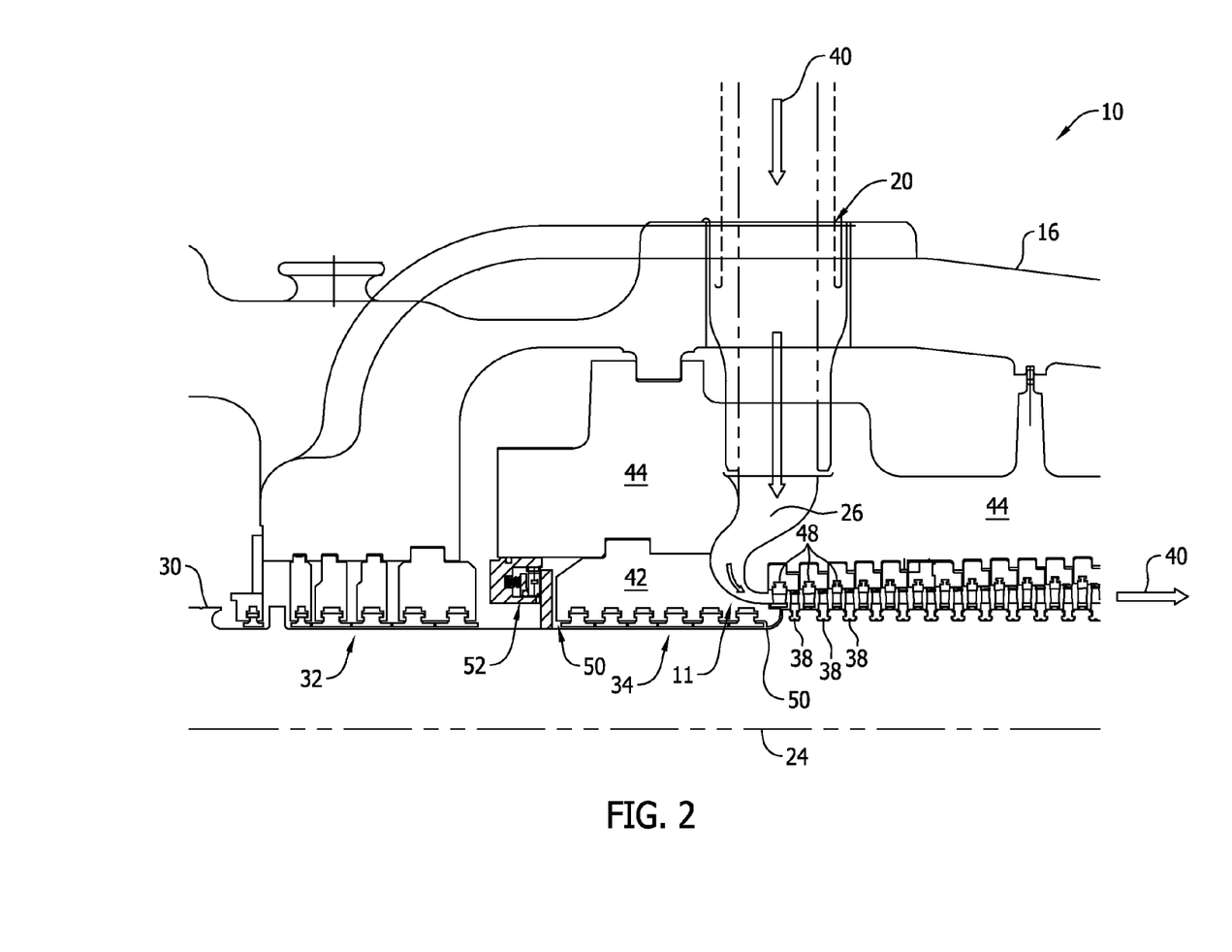
FIG. 2 is a more detailed schematic view of a portion of the steam turbine engine of FIG. 1 taken about an area defined in FIG. 1.

FIG. 2 is a more detailed schematic view of a portion of steam turbine engine 10 taken about area 2 defined in FIG. 1. In the exemplary embodiment shown in FIG. 2, steam turbine engine 10 includes shaft 14, a stator component 42 coupled to an inner shell 44 of casing 16, and a plurality of sealing members 34 attached to stator component 42. Casing 16, inner shell 44, and stator component 42 each extend circumferentially about shaft 14 and sealing members 34. In the exemplary embodiment, sealing members 34 form a tortuous sealing path between stator component 42 and shaft 14. Shaft 14 includes a plurality of turbine stages 12 through which high-pressure high-temperature steam 40 is passed via one or more inlet bowl 26. The turbine stages 12 include a plurality of inlet nozzles 48. Steam turbine engine 10 may include any number of inlet nozzles 48 that enables steam turbine engine 10 to operate as described herein. For example, steam turbine engine 10 may include more or fewer inlet nozzles 48 than shown in FIG. 2. The turbine stages 12 also include a plurality of turbine blades or buckets 38. Steam turbine engine 10 may include any number of buckets 38 that enables steam turbine engine 10 to operate as described herein. For example, steam turbine engine 10 may include more or fewer buckets 38 than are illustrated in FIG. 2. Steam 40 enters inlet bowl 26 through steam inlet conduit 20 and passes down the length of shaft 14 through turbine stages 12.

A portion of the admitted high-pressure high-temperature steam 40 passes through the end packing sealing members 34 via a leakage region 50. The loss of steam 40 through leakage region 50 results in a loss of efficiency of steam turbine engine 10. As described above, to reduce the leakage of steam 40 through the end packing region 32, in the exemplary embodiment, steam turbine engine 10 includes a unique multiple layer, segmented hydrodynamic face seal assembly, generally indicated at 52.

Figure 3:
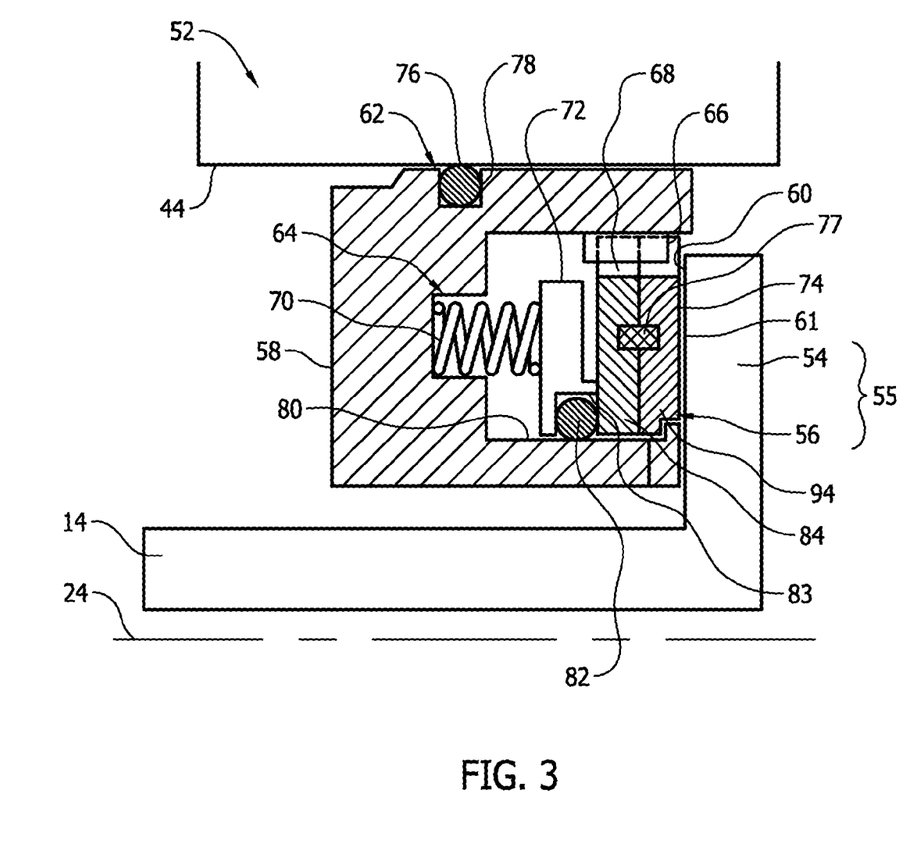
FIG. 3 is a schematic section view of a multiple layer, segmented hydrodynamic face seal used with the steam turbine engine shown in FIG. 1.

FIG. 3 is a schematic section view of a multiple layer, segmented hydrodynamic face seal 52 that may be used with steam turbine engine 10 (shown in FIG. 1.) In the exemplary embodiment, face seal 52 facilitates reducing or preventing leakage of a pressurized process fluid, e.g., steam 40, between a region of relatively high pressure and an area of relatively low pressure. In the exemplary embodiment, face seal 52 is a high pressure seal positioned between shaft 14 and inner shell 44 of casing 16 on an inlet side 11 of turbine stages 12. As described above, although a steam turbine engine 10 is illustrated, face seal 52 may be used in any application where a self-adjusting seal is desirable or required. In the exemplary embodiment, face seal 52 includes a rotating seal ring 54, a stationary seal ring assembly 56, and a seal housing 58 concentric with and extending about centerline axis 24 of shaft 14. Rotating seal ring 54 and stationary seal ring assembly 56 together form a primary seal 55.

In the exemplary embodiment, rotating seal ring 54 is coupled to shaft 14 and is rotatable therewith. Alternatively, rotating seal ring 54 may be formed as an integral part of shaft 14. In the exemplary embodiment, rotating seal ring 54 is generally disk shaped and includes an axially-facing, first primary sealing surface 60 that includes channels or grooves 61 formed therein. Channels or grooves 61 direct process fluid, e.g., steam 40, between rotating seal ring 54 and stationary seal ring assembly 56, thus forming a process fluid film that is generally about 0.002 inches thick or less. Alternatively or additionally, channels or grooves 61 may be formed in a primary sealing surface 74 of stationary seal ring assembly 56.

Seal housing 58 couples stationary seal ring assembly 56 to inner shell 44 of casing 16. Seal housing 58 is a non-rotating, axially-extending component that includes a radial secondary seal 82 that allows seal assembly 56 to slide axially to follow the rotating seal ring 54 dynamically in axial translation while providing sealing. Seal housing 58 also includes one or more spring seats 64. Seal housing 58 may include a radially-inward extending alignment member 66 that is coupled to an alignment slot 68 of stationary seal ring assembly 56. Stationary seal ring assembly 56 is coupled to seal housing 58 such that stationary seal ring assembly 56 is axially movable along centerline axis 24 and is not laterally or rotatably moveable. In some embodiments, seal housing 58 may be integrated with inner shell 44 of casing 16. Furthermore, in some alternative embodiments, stationary seal ring assembly 56 may be coupled directly to inner shell 44 or to stator component 42. In the exemplary embodiment, seal housing 58 is assembled to inner shell 44 with a structural seal 76 extending along an outer diameter 62. Structural seal 76 is positioned in a groove 78 in seal housing 58. In the exemplary embodiment, structural seal 76 is an O-ring. Alternatively, structural seal 76 may be any type of seal that enables face seal 52 to operate as described herein, for example, without limitation, a V-type or C-type metal ring.

One or more biasing components 70, such as a spring, extend between spring seat 64 and a radially-extending biasing ring 72 of stationary seal ring assembly 56. Biasing component 70 biases stationary seal ring assembly 56 away from first seal component 54 so rotatable shaft 14 can start to rotate without initial sealing face contact. Alternatively, biasing component 70 may be configured to bias stationary seal ring assembly 56 towards first seal component 54 so rotatable shaft 14 starts to rotate with initial sealing face contact.

Stationary seal ring assembly 56 has a radially-extending surface that defines an axially-facing, second primary sealing surface 74 on a second primary ring 94. Second primary sealing surface 74 is positioned against first seal component 54 in a face-to-face mating relationship with first primary sealing surface 60. First and second primary sealing surfaces 60 and 74 form a circuitous or tortuous path for flow of process fluid, e.g., steam 40. Stationary seal ring assembly 56 has a support ring 84 behind second primary ring 94. Support ring 84 and second primary ring 94 are in face-to-face contact and coupled together by an element 77 that provides anti-rotation, positioning, and attachment functions. Second primary ring 94 is segmented into at least two pieces. Support ring 84 can be segmented as well, but the segment joints of support ring 84 are offset from the segment joints of second primary ring 94. This two-layer stationary seal ring assembly 56 allows second primary ring 94 segment joints to rest on a continuous surface on support ring 84, thus avoiding potential steps over segment joints. Both support ring 84 and second primary ring 94 can be double lapped to achieve a predetermined flatness requirement (typically less than 0.001 inches) on both side surfaces. In the exemplary embodiment, support ring 84 and biasing ring 72 are separate pieces for ease of manufacture. Alternatively, they may be fabricated as an integral part that is segmented.

In the exemplary embodiment, a secondary seal 82 is positioned between stationary seal assembly 56 and seal housing 58. In the exemplary embodiment, secondary seal 82 is an O-ring. Alternatively, secondary seal 82 may be any type of seal that enables stationary seal assembly 56 to slide axially relative to seal housing 58, such as, for example, a brush seal, piston ring, or Teflon ring. Secondary seal 82 provides sealing against secondary sealing surface 80 of seal housing 58 to prevent leakage of process fluid through stationary seal assembly 56 and seal housing 58 while allowing stationary seal assembly 56 to move axially to follow rotating seal ring 54 movement due to thermal expansion, thrust reverse, or sealing face wobbling due to manufacturing tolerances. In the exemplary embodiment, secondary seal 82 is positioned in a notch or groove 83 formed in biasing ring 72. Alternatively, secondary seal 82 may be positioned in a groove (not shown) on seal housing 58 and provide sealing against a counter-bore (not shown) on biasing ring 72.

Figure 4:
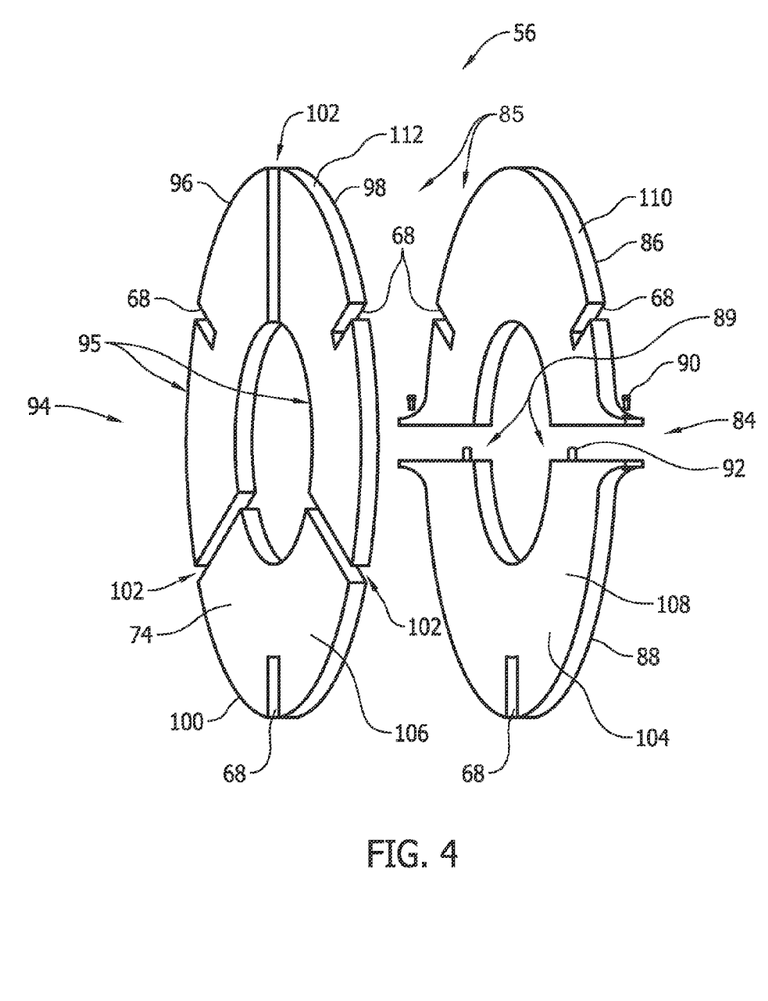
FIG. 4 is a schematic perspective view of a stationary seal ring assembly of the face seal of FIG. 3.

FIG. 4 is a schematic perspective view of stationary seal ring assembly 56. In the exemplary embodiment, stationary seal ring assembly 56 is a multiple layer, segmented seal ring assembly that is fabricated from at least two segmented annular-shaped rings, indicated generally at 85. In the exemplary embodiment, stationary seal ring assembly 56 includes support ring 84 that is divided into an upper support ring member 86 and a lower support ring member 88 that contact each other along joints 89. Alternatively, support ring 84 may be divided into any number of components that enable support ring 84 to operate as described herein. In the exemplary embodiment, joints 89 are butt joints. Alternatively, joints 89 may be any type of joint that enables support ring 84 to operate as described herein. Upper support ring member 86 and lower support ring member 88 each include at least one alignment slot 68 that facilitates aligning and slidably coupling with a respective alignment member 66 of seal housing 58. Alignment slot 68 is formed through a respective support ring member 86 and/or 88 about an outer edge 110 of the respective support ring member 86 and/or 88. Alternatively, upper support ring member 86 and lower support ring member 88 may include any number of alignment slots 68 that are spaced about outer edge 110 of a respective support ring member 86 and/or 88.

Upper support ring member 86 and a lower support ring member 88 are releasably coupled together to form an annular-shaped ring. In the exemplary embodiment, upper support ring member 86 and lower support ring member 88 are coupled together along joints 89 using mechanical fasteners 90, e.g., a threaded fastener such as a bolt and/or a non-threaded fastener such as a rivet. In addition, in the exemplary embodiment, upper support ring member 86 and lower support ring member 88 are coupled together using an alignment pin 92, such as a dowel pin and/or a spring pin. Alignment pin 92 facilitates ensuring proper alignment of upper support ring member 86 relative to lower support ring member 88.

Stationary seal ring assembly 56 also includes sealing ring 94 that is divided into at least two separate components, generally indicated at 95. More specifically, in the exemplary embodiment, seal ring 94 is divided into three substantially identical components: a first seal ring member 96, a second seal ring member 98, and a third seal ring member 100. Alternatively, sealing ring 94 may be divided into any number of components that enable sealing ring 94 to operate as described herein. Each seal ring member 96, 98, and 100 may include at least one alignment slot 68 that aligns with an alignment member 66 of seal housing 58. Each alignment slot 68 is formed through a respective seal ring member 96, 98, and 100 about an outer edge 112 of that respective support ring member 96, 98, and 100. Alternatively, seal ring members 96, 98, and/or 100 may include more than one alignment slot 68. In an alternative embodiment, alignment slot 68 is not needed, but replaced with coupling element 77 shown in FIG. 3. Alternatively, both alignment slot 68 and coupling element 77 may be employed to achieve various levels of alignment.

In the exemplary embodiment, first seal ring member 96, second seal ring member 98, and third seal ring member 100 are coupled to each other along a respective joint 102. Joints 102 are positioned such that they do not overlap with joints 89 of support ring 84. For example, in the exemplary embodiment, joints 89 are located at about the 3 o'clock and 9 o'clock positions, and joints 102 are located at about the 12 o'clock, 4 o'clock, and 8 o'clock positions. Thus, when assembled, the segment joints 89 and 102 are rotationally offset from each other.

Figure 5:
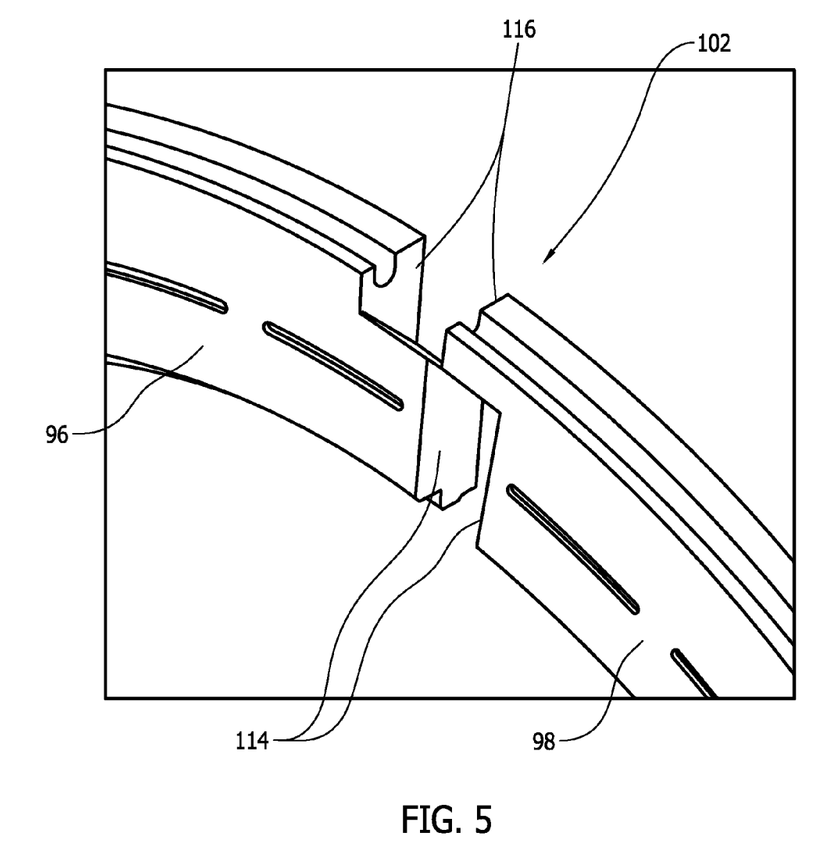
FIG. 5 is a schematic perspective view of an alternative embodiment of a joint of the stationary seal ring assembly shown in FIG. 4.

Joints 102 are non-fastened joints, i.e., seal ring member 96, 98, and/or 100 is positioned adjacent a respective other seal ring member 96, 98, and/or 100 such that joints 102 are mated in face-to-face contact with each other, but are not mechanically fastened together. In the exemplary embodiment, joints 102 are butt joints. Alternatively, as shown in FIG. 5, joints 102 may feature a stepped overlap to help positioning of seal ring member 96, 98, and/or 100, and reduce leakage across joint 102. At each joint 102, there are two sets of end faces, 114 and 116. Upon closure of joint 102, end face set 114 comes into contact and closes up before end face set 116 closes. Thus, end face set 116 is exposed to high pressure which results in less contact pressure on end face set 114. Alternatively, joints 102 may be any type of joint that enables sealing ring 94 to operate as described herein, such as a tongue-in-groove joint.

Referring back of FIG. 4, in the exemplary embodiment, support ring 84 is coupled together using fasteners 90 and alignment pins 92. A front surface 104 and a rear surface 108 of support ring 84 are lapped to a precise predetermined flatness specification using a lapping machine. Sealing ring 94 is assembled and fixtured such that seal ring members 96, 98, and/or 100 are fixed relative to each other. A rear surface 106 and the front surface or second primary sealing surface 74 of sealing ring 94 are lapped to a precise predetermined flatness specification using a lapping machine. Support ring 84 is coupled together using fasteners 90 and alignment pins 92. Sealing ring 94 is assembled and fixtured to support ring 84 such that front surface 104 and rear surface 106 are mated in face-to-face contact, thereby forming stationary seal ring assembly 56. Segment joints 89 and 102 are rotationally offset from each other and front surface or second primary sealing surface 74 of sealing ring 94 and rear surface 108 of support ring 84 are lapped to a precise predetermined flatness specification using a lapping machine. In the exemplary embodiment, support ring 84 and sealing ring 94 are assembled in the same order when assembling face seal 52 in steam turbine engine 10, where support ring 84 and sealing ring 94 are releasably coupled together in mating face-to-face contact and held in position by seal housing 58. The terms front and rear are used for convenience to indicate relative positional relationships.

During operation, in the exemplary embodiment, face seal 52 facilitates reducing leakage of process fluid or steam 40 in steam turbine engine 10. The exemplary face seal 52 also facilitates the assembly and maintenance of large diameter face seal rings on a large diameter shaft such as that found in steam turbine engine 10. In one embodiment, a portion of seal housing 58 may be coupled to the lower half section of casing 16 prior to installation of shaft 14. Shaft 14 is installed into the lower half section of casing 16. Support ring 84 can then be assembled around shaft 14. Further, sealing ring 94 can then be assembled around shaft 14 mating in face-to-face contact with support ring 84. As discussed above, support ring 84 and sealing ring 94 are assembled in the same order are that in which they were lapped flat.

In the exemplary embodiment, a portion of high-pressure high-temperature steam 40 passes through end packing sealing members 34 via a leakage region 50, as shown in FIG. 2. High-pressure steam 40 contacts face seal 52 and provides sufficient force to overcome biasing component 70, if the biasing force is configured to pull back seal assembly 56, thus moving stationary seal ring assembly 56 towards rotating seal ring 54. As stationary seal ring assembly 56 and rotating seal ring 54 approach each other, grooves 61 in rotating seal ring 54 capture a portion of steam 40 and forces it between stationary seal ring assembly 56 and rotating seal ring 54, where it increases in pressure based on the rotational speed of rotating seal ring 54 and the distance between stationary seal ring assembly 56 and rotating seal ring 54. As the gap between stationary seal ring assembly 56 and rotating seal ring 54 decreases, the pressure of steam 40 between stationary seal ring assembly 56 and rotating seal ring 54 increases until it is equal to the closing force that high-pressure steam 40 in leakage region 50 and biasing component 70 are exerting on stationary seal ring assembly 56. Face seal 52 is designed to operate at a gap of about 0.002 inches or less, which facilitates substantially reducing process fluid or steam 40 leakage. As previously discussed, the segmented stationary seal ring assembly 56 facilitates assembly and maintenance of seal ring assembly 56 used in steam turbine engine 10.

The systems and methods as described herein facilitate improving rotary machine performance by providing a sealing assembly that substantially reduces process fluid leakage within a rotary machine. Specifically, a multiple layer segmented hydrodynamic face seal ring that includes a plurality of seal segments is described. The face seal constructed in the way described above can achieve a required face flatness, and may be assembled on or disassembled from a large diameter rotatable shaft in segments, such as the rotatable shaft of a steam turbine engine. Therefore, in contrast to known hydrodynamic face seal rings formed as one piece, the apparatus, systems, and methods described herein facilitate the assembly and maintenance of large diameter face seal rings and facilitate reducing the process fluid leakage from the rotary machine.

The methods and systems described herein are not limited to the specific embodiments described herein. For example, components of each system and/or steps of each method may be used and/or practiced independently and separately from other components and/or steps described herein. In addition, each component and/or step may also be used and/or practiced with other assemblies and methods.

While the invention has been described in terms of various specific embodiments, those skilled in the art will recognize that the invention can be practiced with modification within the spirit and scope of the claims.

What is claimed is:

1. A hydrodynamic face seal ring for use with a rotary machine, said face seal ring comprising:
   a support ring comprising at least two support ring segments and a radially-extending first face, said support ring configured to releasably couple to an inner surface of an outer casing of the rotary machine; and
   a sealing ring coupled substantially coaxially with said support ring, said sealing ring comprising at least two sealing ring segments and a radially-extending second face, said sealing ring releasably coupled to said support ring such that said first face is mated against said second face in direct face-to-face contact.

2. A face seal ring in accordance with claim 1, wherein said at least two support ring segments join together at a respective support ring joint, wherein said at least two sealing ring segments join together at a respective sealing ring joint, and wherein said respective sealing ring joint and said respective support ring joint are rotationally offset from each other about a centerline axis defined by said face seal ring.

3. A face seal ring in accordance with claim 1, wherein said support ring further comprises at least one mechanical fastener configured to releasably couple said at least two support ring segments together.

4. A face seal ring in accordance with claim 1, wherein said support ring further comprises at least one alignment pin configured to align said at least two support ring segments to each other.

5. A face seal ring in accordance with claim 1, wherein each of said at least two support ring segments comprises at least one alignment slot defined therethrough, said at least one alignment slot configured to slidably couple to a respective alignment member of a seal housing.

6. A face seal ring in accordance with claim 1, wherein each of said at least two sealing ring segments comprises at least one alignment slot defined therethrough, said at least one alignment slot configured to slidably couple to a respective alignment member of a seal housing.

7. A rotary machine comprising:
a casing;
a rotatable shaft having a centerline axis; and
a sealing system comprising:
a first seal ring comprising a first primary sealing surface;
a support ring comprising at least two support ring segments and a radially-extending first face, said support ring configured to releasably couple to an inner surface of said casing; and
a second seal ring comprising at least two sealing ring segments, a second primary sealing surface and an opposite radially-extending second face, said second seal ring releasably coupled to said support ring such that said first face is mated against said second face in direct face-to-face contact; and
a seal housing coupled to at least one of said second seal ring and said support ring and moveable therewith.

8. A rotary machine in accordance with claim 7, wherein said sealing system further comprises a biasing ring coupled to said support ring.

9. A rotary machine in accordance with claim 7, wherein said sealing system further comprises a biasing component coupled between said seal housing and said second seal ring.

10. A rotary machine in accordance with claim 9, wherein said biasing component is configured to bias said second seal ring away from said first seal ring axially along the centerline axis of said rotatable shaft.

11. A rotary machine in accordance with claim 7, wherein said seal housing is coupled to said casing.

12. A rotary machine in accordance with claim 11, wherein said seal housing comprises a secondary seal positioned between said seal housing and said casing.

13. A rotary machine in accordance with claim 7, wherein said seal housing comprises at least one radially-inward extending alignment member.

14. A rotary machine in accordance with claim 13, wherein each of said at least two support ring segments and each of said at least two sealing ring segments comprise at least one alignment slot defined therethrough, said at least one alignment slot configured to slidably couple to said at least one alignment member.

15. A rotary machine in accordance with claim 7, wherein said at least two support ring segments join together at a respective support ring joint, wherein said at least two sealing ring segments join together at a respective sealing ring joint, and wherein said respective sealing ring joint and said respective support ring joint are rotationally offset from each other about the centerline axis of the shaft.

16. A rotary machine in accordance with claim 7, wherein said first seal ring is coupled to said rotatable shaft for rotation therewith.

17. A method of assembling a sealing system, said method comprising:
coupling a seal housing to an inner surface of a casing of a rotary machine;
releasably coupling a support ring to the seal housing, the support ring including at least two support ring segments coupled together at a respective support ring joint, the support ring further including a radially-extending first face; and
releasably coupling a sealing ring coaxially to the support ring, the sealing ring including at least two sealing ring segments coupled together at a respective sealing ring joint, the support ring further including a radially-extending second face that is mated against the first face in direct face-to-face contact.

18. The method in accordance with claim 17, further comprising rotationally offsetting the respective sealing ring joint and the respective support ring joint are from each other about a centerline axis defined by the support ring and the sealing ring.

19. The method in accordance with claim 17, wherein releasably coupling a support ring to the seal housing further comprises slidably coupling the segmented support ring to the seal housing for movement therewith.

* * * * *